United States Patent
Nur

(10) Patent No.: US 6,516,080 B1
(45) Date of Patent: Feb. 4, 2003

(54) NUMERICAL METHOD OF ESTIMATING PHYSICAL PROPERTIES OF THREE-DIMENSIONAL POROUS MEDIA

(75) Inventor: Amos M. Nur, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 0 days.

(21) Appl. No.: 09/543,829

(22) Filed: Apr. 5, 2000

(51) Int. Cl.[7] ................................. G06K 9/00
(52) U.S. Cl. ..................... 382/109; 73/784; 348/85
(58) Field of Search ..................... 382/109; 73/784; 348/85; 367/9, 35, 73; 703/9, 2

(56) References Cited

U.S. PATENT DOCUMENTS

| | | | |
|---|---|---|---|
| 4,628,468 A | 12/1986 | Thompson et al. | 364/556 |
| 4,727,498 A * | 2/1988 | Ehrlich et al. | 382/109 |
| 4,864,845 A | 9/1989 | Chandler et al. | 73/38 |
| 4,868,883 A | 9/1989 | Chen | 382/1 |
| 4,882,763 A | 11/1989 | Buchan et al. | 382/1 |
| 4,969,111 A | 11/1990 | Merva | 364/556 |
| 4,991,095 A | 2/1991 | Swanson | 364/421 |
| 5,129,268 A * | 7/1992 | Uesugi et al. | 73/865 |
| 5,134,271 A | 7/1992 | Sondergeld et al. | 235/376 |
| 5,146,086 A | 9/1992 | Ed et al. | 250/253 |
| 5,148,494 A * | 9/1992 | Keskes | 382/109 |
| 5,229,976 A | 7/1993 | Boyd et al. | 367/73 |
| 5,321,612 A | 6/1994 | Stewart | 364/420 |
| 5,379,645 A | 1/1995 | Smart | 73/794 |
| 5,432,718 A * | 7/1995 | Molvig et al. | 703/9 |
| 5,463,894 A | 11/1995 | Fleury et al. | 73/38 |
| 5,663,073 A | 9/1997 | Oraby | 436/28 |
| 5,671,136 A | 9/1997 | Willhoit, Jr. | 364/421 |
| 5,689,068 A | 11/1997 | Locatelli et al. | 73/152.02 |
| 5,706,194 A | 1/1998 | Neff et al. | 364/421 |
| 5,764,515 A | 6/1998 | Guerillot et al. | 364/420 |
| 5,767,399 A | 6/1998 | Smith et al. | 73/152.11 |
| 6,018,497 A | 1/2000 | Gunasekera et al. | 367/72 |
| 6,064,944 A | 5/2000 | Sarda et al. | 702/11 |
| 6,226,390 B1 * | 5/2001 | Deruyter et al. | 382/109 |
| 6,345,108 B1 * | 2/2002 | Faraj | 382/109 |

OTHER PUBLICATIONS

Gunstensen et al., Lattice–Boltzmann of immiscible two phase flow through porous media, 1993, vol. 98, pp. 6431–6441.*

William J. Bosl et al., "A study of porosity and permeability using a lattice boltzmann simulation," Geophysical Research Letters, vol. 25, No. 9, pp. 1475–1478, May 1, 1998.

(List continued on next page.)

Primary Examiner—Leo Boudreau
Assistant Examiner—Barry Choobin
(74) Attorney, Agent, or Firm—Lumen Intellectual Property Services, Inc.

(57) ABSTRACT

A section is prepared from a specimen of porous media, e.g., Rock, typically including filling the pore spaces with a dyed epoxy resin. A color micrograph of the section is digitized and converted to an n-ary index image, for example a binary index image. Statistical functions are derived from the two-dimensional image and used to generate three-dimensional representations of the medium. Boundaries can be unconditional or conditioned to the two-dimensional n-ary index image. Desired physical property values are estimated by performing numerical simulations on the three-dimensional representations. For example, permeability is estimated by using a Lattice-Boltzmann flow simulation. Typically multiple equiprobable three-dimensional representations are generated for each n-ary index image, and the multiple estimated physical property values are averaged to provide result.

33 Claims, 6 Drawing Sheets

OTHER PUBLICATIONS

Mavko et al., *The rock physics handbook*, Cambridge University Press, Cambridge, England, 329, pp. 260–264.

Deutsch et al., *Geostatistical Software Library and User's Guide*, Oxford Uiversity Press, New York, pp. 13–14.

Walsh et al., *The Effect of pressure on porosity and the transport properties of rock*, J. of Geophysical Research, 89(B11), pp. 9425–9431, 1984.

Blair et al., *Two–point cporreslation functions to characterize microgeometry and estimate Permeabilitie of synthestic and natureal sandstones*, LLNL, Univ. of CA–Livermore, pp. 1–.

Gunstensen et al., *Lattice Boltzmann model of immiscible fluids*, Phys. Rev. A. , 43, pp. 4320–4327.

Ladd, *Numerical simulations of particulate suspensions via a discretized Boltzman equation Part 1 theroretical foundation*, J. Fluid Mech., 271, pp. 285–309, 1994.

Olson, *Two–fluid flow in sedimentary rock:simulation, transport and complexity*, J. Fluid Mech., 341, pp. 343–370, 1997.

Gunstensen, *Lattice–Boltzmann studies of immiscible two–phase flow through porous media*, J. of Geophys. Research, 98(B4), pp. 6431–6441, 1993.

* cited by examiner

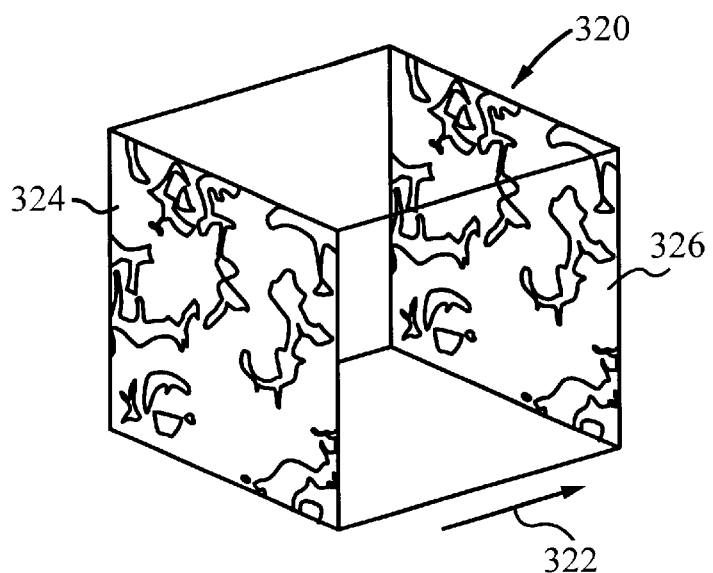
FIG. 4A
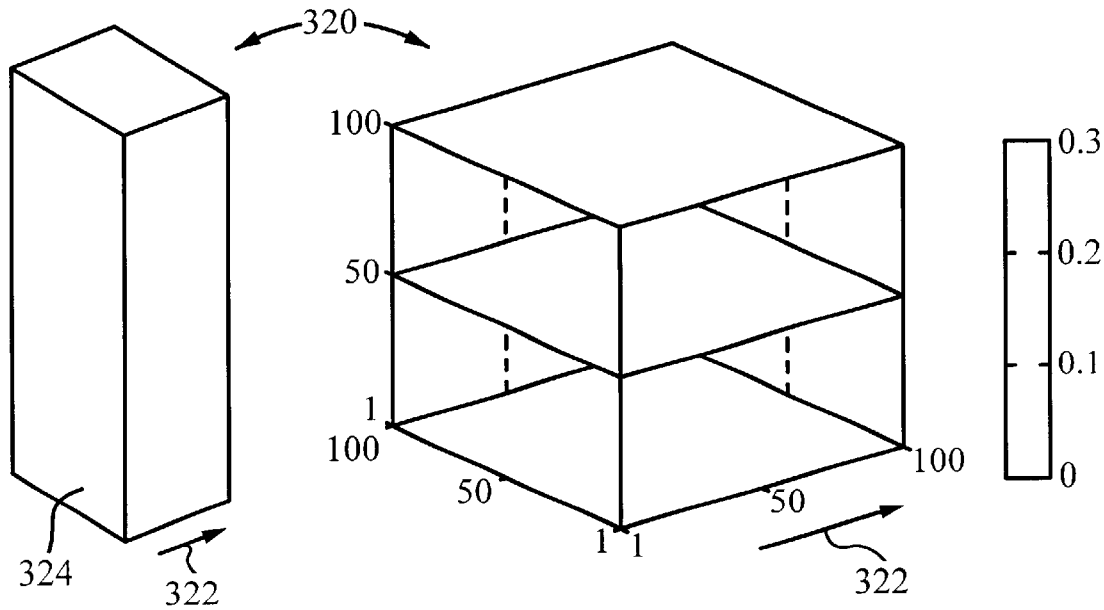
FIG. 4B  FIG. 4C

NUMERICAL METHOD OF ESTIMATING PHYSICAL PROPERTIES OF THREE-DIMENSIONAL POROUS MEDIA

FIELD OF THE INVENTION

This invention relates generally to a method of estimating physical properties of three-dimensional porous media. More particularly, it relates to estimating physical properties of rock, bone, soils, ceramics, granular media, and other composites.

BACKGROUND ART

There has been long-term interest in the estimation of physical properties of three-dimensional (3D) porous media using numerical methods. For example, estimation of permeability from rock samples and well log data is of great importance in petroleum exploration. The prediction of permeability is one of the most important challenges in quantitative rock physics. Many relatively successful and common methods are empirical ones, such as the widely known Kozeny-Carman Relation based on simple cylindrical pore geometry (see for example Mavko et al., "The Rock Physics Handbook," Cambridge University Press, Cambridge, England, 1998, pp. 260–264). This relation provides a way to relate the permeability of porous media to some parameters, like porosity, surface area, grain size, etc.

Walsh and Brace, "The Effect of Pressure on Porosity and the Transport Properties of Rock," J. of Geophysical Research, V.89, no. B11, Oct. 10, 1984, pp. 9425–9431, related the permeability to porosity, geometrical factor, formation factor, and specific surface area, and provided a good means of correlating the data on permeability and formation factor for low porosity and low permeability granites. Conventional methods for permeability prediction from thin sections use two-point correlation of thin section images (see for example Blair et al., "Two-point Correlation Functions to Characterize Microgeometry and Estimate Permeabilities of Synthetic and Natural Sandstones," Lawrence Livermore National Laboratory Report UCRL-LR-114182, Livermore, Calif., August 1993). These methods can predict permeability within a reasonable range of errors. However, the specific surface area needs to be determined from the correlation function. This determination requires high resolution and is very sensitive to scale, which can introduce errors in the estimation. In addition, they still need empirical parameters, formation factor and geometrical factor, that are hardly ever measured directly from thin sections.

Blair et al. (1993, cited above) suggested a method for estimating porosity and the specific surface area through image processing of thin sections. They then used the estimated parameters from the empirical relation by Walsh and Brace (1984, cited above) for estimation of permeability, providing a good result in estimating permeability of some sandstones. However, there are typically limitations to estimating the parameters. The formula for estimation of permeability shows strong dependency on the specific surface area, which is difficult to determine and very sensitive to the scale of the image. On the other hand, the formation factor derived from electric properties of rocks and the geometric factor is not directly measurable from the image. Empirical estimates for these parameters are still needed.

There is a need, therefore, for a methodology and a system to estimate numerically physical properties of three-dimensional (3D) porous media with high accuracy using minimal measurements on thin section specimens. There is a need further to estimate these physical properties using a simple methodology requiring a minimal number of empirical parameters.

OBJECTS AND ADVANTAGES

Accordingly, it is a primary object of the present invention to provide an accurate numerical methodology to estimate physical properties of three-dimensional (3D) porous media. It is a further object of the invention to provide such a methodology that operates simply, requiring a minimum of empirical parameters. It is an additional object of the invention to provide such a methodology that utilizes simple and minimal measurements that can be performed easily on specimens of the porous media. It is another object of this invention to provide a methodology for estimating multiple physical properties of the same porous media, thereby permitting cross-relations to be examined.

SUMMARY

These objects and advantages are attained by a numerical method for estimating physical properties of three-dimensional (3D) porous media. In accordance with the present invention, this numerical method is based on processed n-ary images of sections of porous media.

In an embodiment of the invention, a thin section is prepared from a specimen of porous media, for example rock, glass, bone, soils, ceramic, sintered granular material, or porous composite material, e.g., concrete. Typically preparation includes filling the pore space portion of the thin section with an epoxy or other polymer resin that has been dyed to contrast optically with the adjacent solid portion. A color micrograph of the thin section is taken and digitized. In some embodiments, a color micrograph is taken of a specimen surface without thinning, with the other preparation steps remaining the same as described above. Using a known digital image processing technique, the micrograph is converted to a binary or higher order n-ary two-dimensional index image. For example, in a binary index image the first binary index can represent the pore space portion and the second binary index can represent the solid portion. In a higher order n-ary index image, various n-ary indices can represent, for example, a pore space portion, a solid, quartz portion, a solid calcite portion, a dolomite portion, a pyrite portion, a siderite portion, a clay portion, a biotite portion, a muscovite portion, and/or a solid feldspar portion respectively. Statistical functions are derived from the two-dimensional n-ary index image, for example, a variogram, a neighborhood template-based multiple point function, an autocorrelation function, and/or a porosity.

Using the statistical functions in cooperation with the n-ary index image, simulated three-dimensional representations of the medium are generated. These representations provide for example a three-dimensional model of porosity in simulated media shaped, for example, as a cube, rectangular prism, cylinder, or other three-dimensional shape having two substantially parallel faces. Each linear dimension of a three-dimensional representation is typically on the order of a predetermined number of autocorrelation lengths. In generating these three-dimensional representations, boundaries can be unconditional or can be advantageously conditioned to the two-dimensional n-ary index image. Typically multiple (e.g., eight or more) equiprobable three-dimensional representations are generated for each n-ary index image, and the values of the physical properties obtained with the multiple representations are averaged to provide a final result.

Desired physical properties can include fluid flow, electrical, and elastic properties, such as permeability, electrical conductivity, and elastic wave velocity. These properties are estimated by performing numerical simulations on the three-dimensional representations. For example, permeability is estimated by using a Lattice-Boltzmann flow simulation as a numerical solver of Navier-Stokes equations for steady flow within a three-dimensional pore space. For electrical conductivity or elastic wave velocity, a finite element numerical solver is advantageously applied. The methodology of the invention can be used to provide estimates of multiple physical properties of the same porous media, permitting cross-relations to be examined.

Thereby the present invention provides an accurate numerical methodology and system to estimate physical properties of three-dimensional (3D) porous media. The invention further provides a relatively simple operating methodology and system requiring a minimum of empirical parameters. Additionally the invention provides a methodology and system that utilize simple and minimal measurements that can be performed easily on specimens of porous media.

BRIEF DESCRIPTION OF THE FIGURES

The present invention may be better understood, and its numerous objects, features, and advantages made apparent to those skilled in the art by referencing the accompanying drawings. For simplicity and ease of understanding, the use of similar reference symbols in different drawings indicates similar or identical items.

FIG. 4A is a perspective view of a simulated 3D cube;

FIGS. 4B and 4C are 3D perspective graphic representations of fluid flux distributions after flow simulation;

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

In accordance with the present invention, a numerical method for estimating physical properties of three-dimensional (3D) porous media is based on processed n-ary images of sections taken from a sample. However, rather than resorting to empirical parameters, the present method generates realizations of 3D porous media by statistical sequential indicator simulation (SIS) with parameters from a two-dimensional binary or n-ary image. An indicator variogram of the binary image is modeled, and 3D porous media are simulated by SIS using data from the section. Simulation of the 3D porous media can be performed using unconditional boundaries or boundaries conditioned to the two-dimensional binary or n-ary image. Then, for example for permeability estimates, fluid flow simulation by, the Lattice-Boltzmann method is performed, providing a computed fluid flux from which permeability is estimated. Alternatively, for estimating other physical properties electrical or elastic simulations, for example, can be performed. Image processing, statistical derivations, and numerical simulations are advantageously performed digitally in a conventional high-speed computer.

Figure 1:
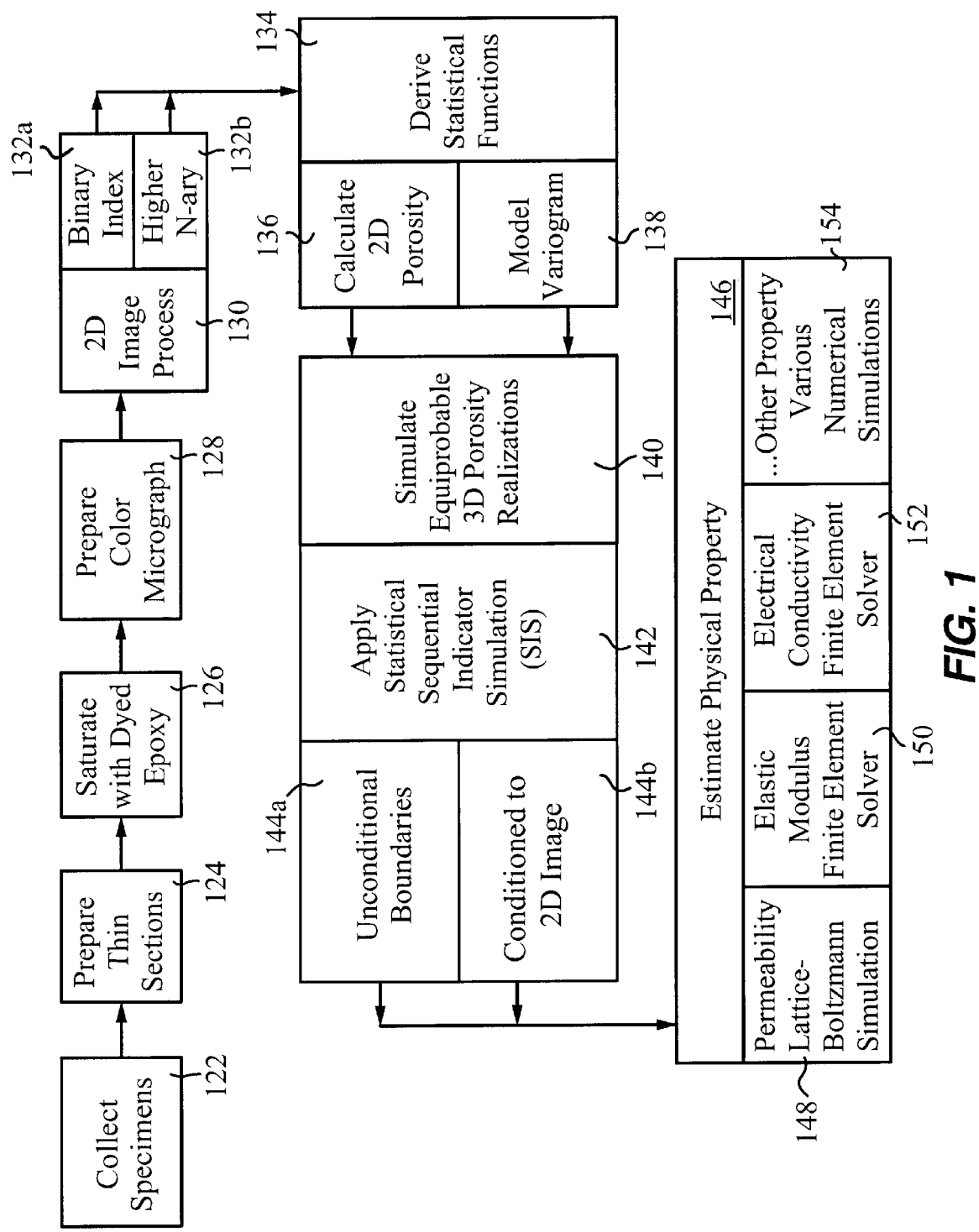
FIG. 1 is a work-flow diagram illustrating a numerical method of estimating physical properties of three-dimensional porous media, in accordance with an embodiment of the present invention.

FIG. 1 is a work-flow diagram illustrating a numerical method of estimating physical properties of three-dimensional porous media, in accordance with an embodiment of the present invention. At block 122, specimens of porous media are collected. Thin sections of the specimens are typically prepared (block 124). These sections are typically saturated with a dyed epoxy resin (block 126), after which color micrographs are prepared (block 128). In an alternative implementation, color micrographs are taken directly of a specimen surface without thinning. In the latter case, the volume of the sample adjacent the surface is typically saturated with dyed epoxy resin, as in block 126. These color micrographs are converted to digitally processed 2D n-ary index images at block 130. As illustrated by blocks 132a, 132b, these processed images can be binary or higher order n-ary. Statistical functions are derived from the n-ary digital images at block 134. For example, a 2D porosity is calculated at block 136, and a variogram is modeled at block 138.

Equiprobable plural 3D realizations of the porous medium are simulated at block 140, including statistical sequential indicator simulation (SIS) at block 142. The simulation of block 142 can be applied with unconditional boundaries 144a or with boundaries 144b conditioned to the 2D digitized image. At block 146 a numerical simulation is performed to estimate the desired physical property. For example, the fluid flow property of permeability is estimated by a Lattice-Boltzmann simulation at block 148, elastic modulus is estimated by a finite element solver at block 150, and electrical conductivity is estimated by a finite element solver at block 152. Other physical properties are estimated by various numerical simulations as represented at block 154.

In accordance with the invention, estimation of one physical property of porous media, as shown for example in blocks 148, 150, 152, or 154 of FIG. 1, does not exclude estimation of another physical property of the same media. Accordingly, the methodology of the invention provides estimates of multiple physical properties of the same porous media, permitting cross-relations to be examined.

Figure 2A:
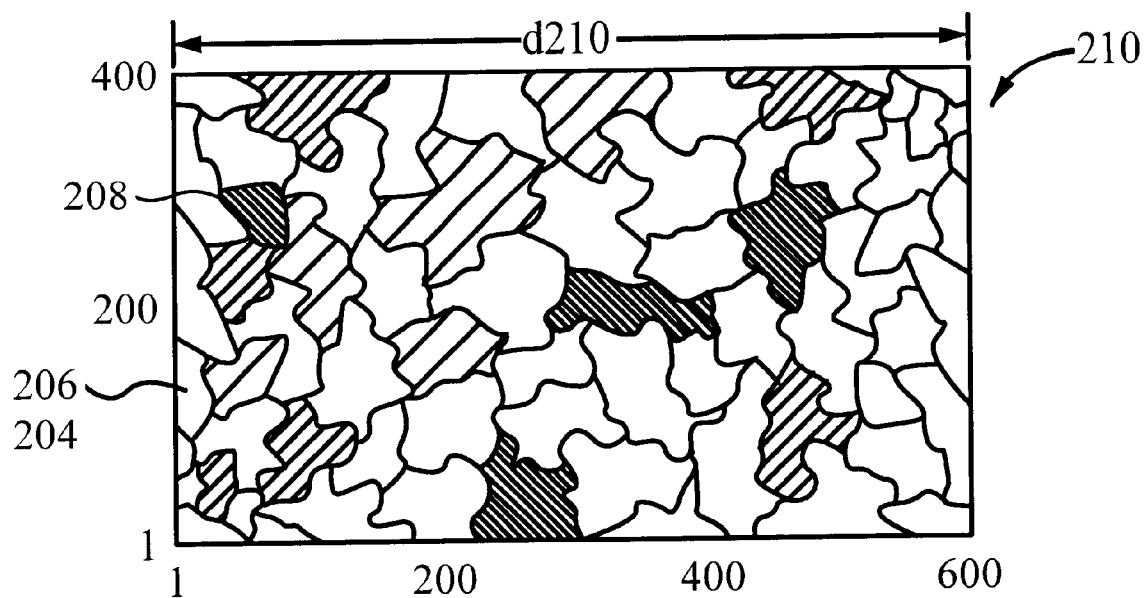
FIG. 2A is a schematic representation of a color micrograph.

In an embodiment of the present invention, a thin section of porous media, e.g. rock, bone, soils, etc., is saturated by an epoxy or other polymer resin. FIG. 2A is a schematic representation of a color micrograph, represented by micrograph 210, made of the thin section. Alternatively, micrograph 210 can be made directly of a surface of an unthinned specimen of porous media, in which case a volume of the specimen adjacent the surface is typically saturated by a polymer resin. Micrograph 210 shows a pore portion 206 and a grain (solid) portion 208. Preferably an epoxy 204 fills pore portion 206 of the section. Typically, epoxy 204 is dyed, for example blue, providing optical contrast between pore portion 206 and solid portion 208. In this process, typically multiple images are exposed at arbitrary positions on the surface of the section. Units on both horizontal and vertical axes of FIG. 2A are pixels. The image in micrograph 210 typically has a long dimension d210 of the order of 3 mm and contains in the range of 400×600 pixels.

Figure 2B:
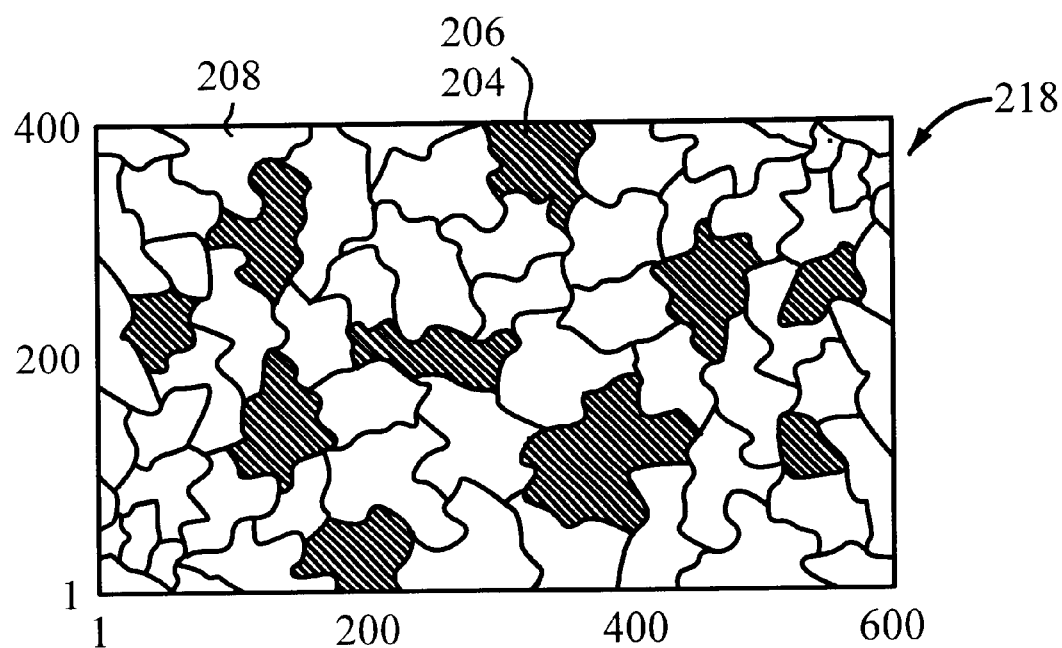
FIG. 2B is a schematic view of a binary index image digitized and converted from the micrograph of FIG. 2A.
Figure 3A:
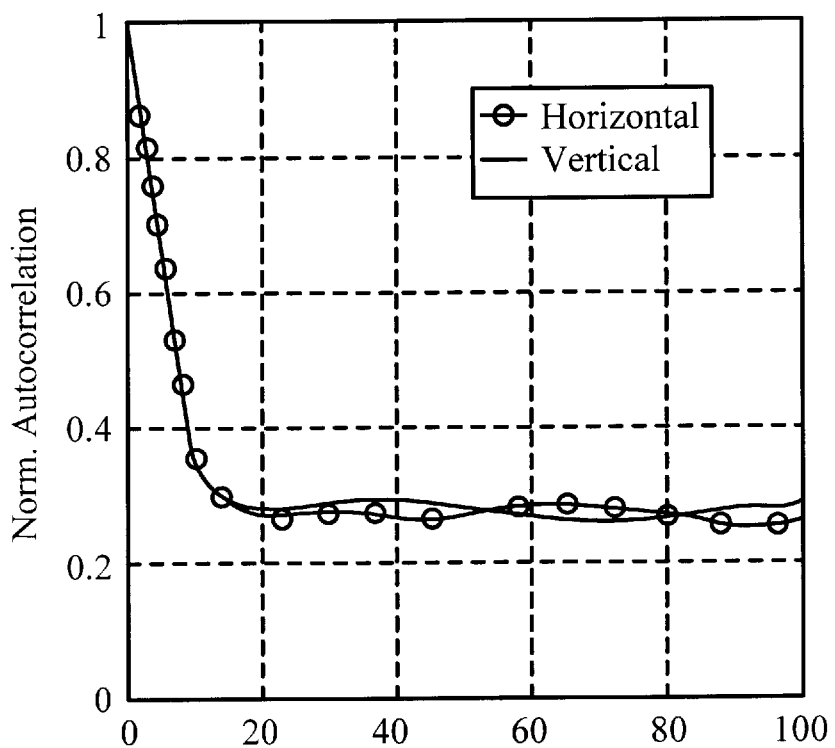
FIG. 3A is a graphic representation of the autocorrelation function of the binary image shown in FIG. 2B.

FIG. 2B is a schematic view of a binary index image 218 typically digitized and converted from micrograph 210 using conventional image processing technology. Units on both horizontal and vertical axes of FIG. 2B are pixels. Pore portion 206 is easily distinguished from solid portion 208 by the optical contrast between dyed epoxy 204 in pore portion 206 and undyed solid portion 208. Alternatively, micrograph 210 can be converted into an n-ary index image at block 132b of FIG. 1, in which various n-ary indices represent, for example, a pore space portion, a solid quartz portion, a solid calcite portion, a dolomite portion, a pyrite portion, a siderite portion, a clay portion, a biotite portion, a muscovite portion, a solid feldspar portion, and/or other mineral structure portions. Binary index image 218 can be represented by an indicator function f(r), which has a value of 1 for pore portion 206 and a value of zero for solid portion 208 at a location r. Then porosity is expressed as $$\phi = <f(r)>,$$

where <·> denotes the statistical average. The autocorrelation function and covariance function are given by $$A(h) = <f(r)f(r+h)>,$$

$$C(h) = <f(r)f(r+h)> - <f(r)><f(r+h)>,$$

where h is a vector between two surface data points. The autocorrelation function can be obtained easily using Fourier transforms, $$A(h) = F^{-1}\{F\{f(r)\} \times F^*\{f(r)\}\},$$

where $F\{\cdot\}$, $F^{-1}\{\cdot\}$ denote Fourier and Inverse Fourier Transform and * denotes the complex conjugate. FIG. 3A is a graphic representation of the normalized autocorrelation function of the binary image shown in FIG. 2B. Units along the horizontal axis are length in millimeters. FIG. 3A shows that the specimen is nearly isotropic, as indicated by the negligible difference between the respective horizontal land vertical autocorrelation functions.

If rock is supposed to be statistically homogeneous, the surface (2D) statistical averages can be replaced by volume (3D) averages, if a reasonable sample size is chosen from all populations. If a rock is also isotropic, those volume averages can be the same as the corresponding surface averages. In FIG. 3A, because the vertical and horizontal autocorrelation functions are very similar, the rock is assumed to be isotropic, at least in 2D over the area in which the section lies. Although the detailed topography of the rock in the third direction perpendicular to the surface of the section is not known, isotropy is assumed for all directions.

Figure 3B:
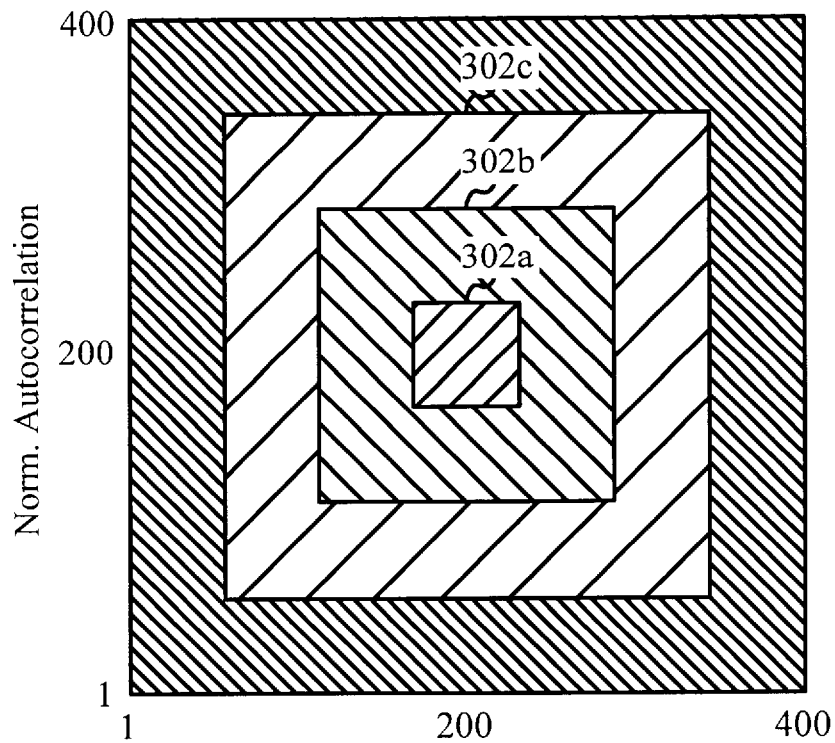
FIGS. 3B and 3C show the variation of porosity by choosing different locations and different sizes of binary index image.
Figure 3C:
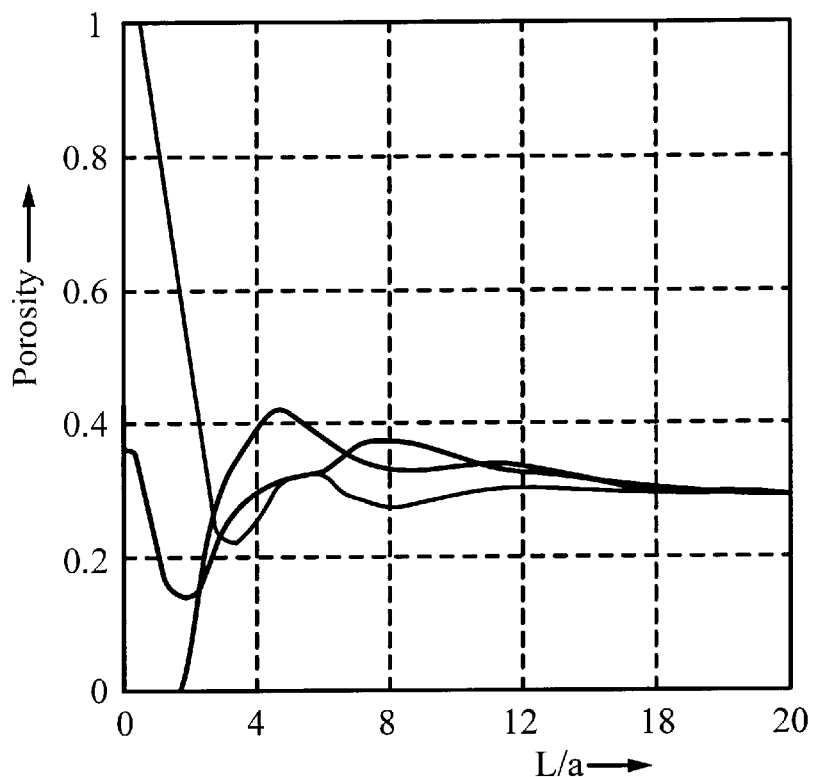

The homogeneity of the rock can be checked against porosity. FIGS. 3B and 3C show the variation of porosity by choosing different locations and different sizes of binary index image 218. FIG. 3B is a schematic view showing different lines 302a–302c denoting different locations of square areas of varying size for calculating porosity for binary index image 218. Each line 302a–302c starts at a random pixel of binary index image 218, and successive lines 302a–302c enclose increasing square areas, over which porosity is calculated.

FIG. 3C is a graphic representation of normalized porosity calculated over square areas enclosed by the various lines 302a–302c in FIG. 3B as a function of the length L of the square normalized to the autocorrelation length a, determined as described below. Different curves denote different locations of the squares. As length L increases, the calculated porosity fluctuates and then settles to a substantially constant value. This value of L provides a representative elementary volume (REV) for accurate porosity estimation. Under the assumption of homogeneous and isotropic media, REV can be the same as representative elementary area.

When a predetermined length L of the square is about 15 times autocorrelation length a, the square can represent the entire rock fairly well in terms of porosity. All of the different curves tend to converge to a constant porosity, which is almost identical to laboratory measurement. A length L of 20 or more times autocorrelation length a is preferably predetermined for accurate porosity estimation, agreeing within two per cent or less with laboratory measurements. However, predetermined lengths L chosen over a range extending down to 10 and more times autocorrelation length a conventionally provide acceptable porosity estimations, and predetermined lengths L as short 3 times autocorrelation length a lead to good permeability estimates if averaging is performed over multiple realizations, as described below in more detail. The results of subsequent procedures, as described below, are strongly dependent on estimated porosity. Stochastic realizations of 3D porous media are simulated using spatial statistical parameters derived in the previous procedures. First, a variogram is modeled for the binary image. The variogram has nearly the same meaning as the autocorrelation function, except that it reflects the dissimilarity of data in a spatial distribution. The variogram is given by an expression (see Deutsch et al., "GSLIB: Geostatistical Software Library and User's Guide," Oxford University Press, New York, 1998, pp. 13–14)

$$\gamma(h) = \frac{1}{2N(h)} \sum_{i=1}^{N(h)} [z(r_i) - z(r_i + h)]^2,$$

where N(h) is the number of pairs of data locations a vector h apart. The variogram of binary index image 218 can be related to the covariance function previously defined, $$\gamma(h) = C(0) - C(h).$$

Figure 3D:
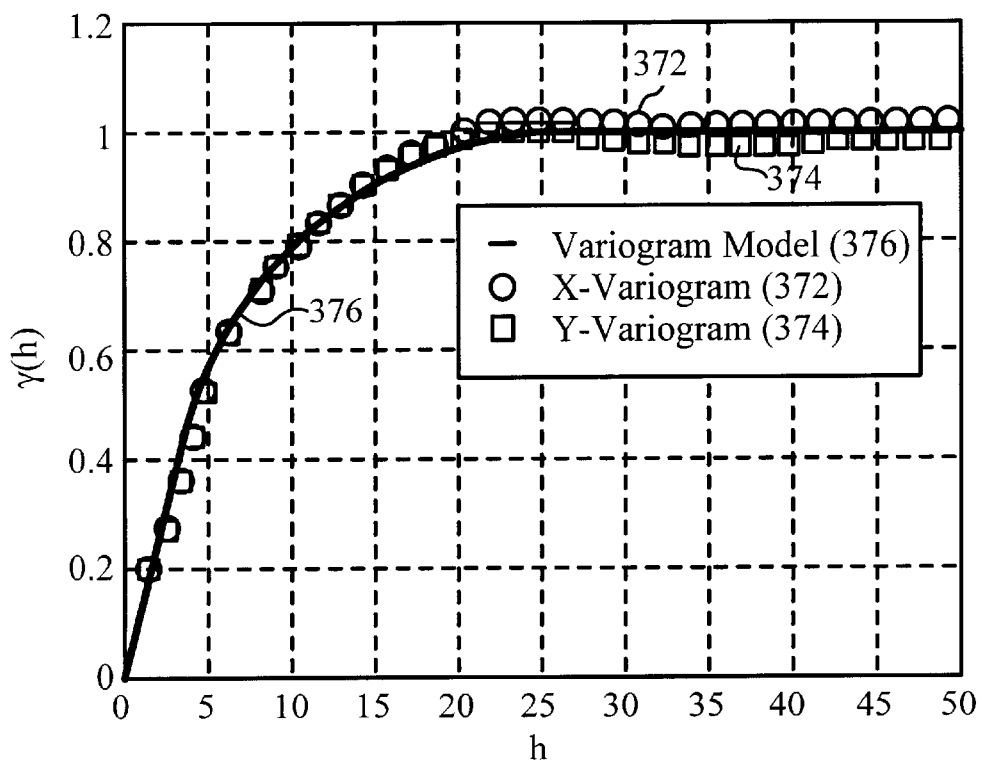
FIG. 3D is a graphic representation showing variograms of x and y directions and a variogram model by an exponential function.

In an embodiment of the present invention, a variogram model is made with a positive definite function for simulation. Preferably this is an exponential function, for example $$g(h) = c\left[1 - \exp\left(\frac{-3h}{a}\right)\right],$$

where a is a practical range (e.g. correlation length). Correlation length a is typically determined by empirically fitting a function, such as the above exponential function, to experimental data. The empirical constant a is then an estimate of the correlation length. FIG. 3D is a graphic representation showing variograms of x and y directions represented by reference numbers 372 and 374 respectively and a variogram model by an exponential function represented by a solid curve 376. In various embodiments of the present invention, other statistical functions are calculated, including semi-variogram, porosity, and/or neighborhood template-based multiple point functions.

From the variogram, multiple equiprobable 3D porous media are simulated. Since most interpolation algorithms such as kriging tend to smooth out local details of spatial variation, they are not adequate for generating 3D pore space. Therefore a simulation technique is advantageously selected. Simulations can be unconditional, but are preferably conditioned to the section. For example, a sequential indicator simulation (SIS) algorithm is applied (see Deutsch et al., cited above) [REF].

FIG. 4A is a perspective schematic view of a simulated 3D cube 320. The flow simulation algorithm requires a periodic boundary condition along the flow direction, represented by an arrow 322. Therefore conditional boundaries from binary index image 218 are advantageously included at two parallel ends 324 and 326 of cube 320. Preferably multiple realizations (e.g. eight or more) of simulated 3D cubes 320 are generated for each section. In embodiments of the present invention, a 3D realization can have any bounded 3D shape that has two parallel faces. These shapes include but are not limited to cubes, rectangular prisms, and cylnders.

The Lattice-Boltzmann method is used as a numerical solver of the Navier-Stokes equations for numerical flow simulation to calculate permeability of simulated 3D cubes. The Lattice-Boltzmann method is a robust tool for flow simulation, particularly in media with complex geometry (see for example Ladd, "Numerical Simulations of Particulate Suspensions via a discretized Boltzmann Equation," Part 1: Theoretical Foundation, J. Fluid Mech., v271, 1994, pp285–309; Gunstensen et al., "Lattice Boltzmann Model of Immiscible Fluids," Phys. Rev. A., v.43, no. 8, Apr. 15, 1991, pp. 4320–4327; Olsen et al., "Two-fluid Flow in Sedimentary Rock: Simulation, Transport and Complexity," J. Fluid Mechanics, Vol.341, 1997, pp. 343–370; and Gustensen et al., "Lattice-Boltzmann Studies of Immiscible Two-Phase Flow Through Porous Media," J. of Geophysical Research, V.98, No. B4, Apr. 10, 1993, pp. 6431–6441).

The Lattice-Boltzmann method describes the fluid motion as collisions of imaginary particles, which are much larger than actual fluid molecules, but show almost the same behavior at a macroscopic scale. The algorithm repeats collisions of these imaginary particles until steady state is reached, and provides a distribution of local mass flux.

In accordance with the present invention, the Lattice-Boltzmann method is applied successfully for many pore structures, including cylindrical tubes, random densely packed spheres, and 3D Fontainbleau sandstone digitized by x-ray tomography. Results agree well with laboratory measurements and theoretical predictions. FIGS. 4B and 4C are 3D perspective graphic representations of fluid flux distributions after flow simulation. Flux values are normalized to maximum flux. Boundary conditions are uniform pressure gradient across the two ends of the cube perpendicular to the flow direction and no flow along the sides. Permeability is calculated by averaging flux through the area perpendicular to the flow direction and dividing this average flux by the pressure gradient. FIG. 4C schematically shows sliced maps of the high flux area.

Figure 5A:
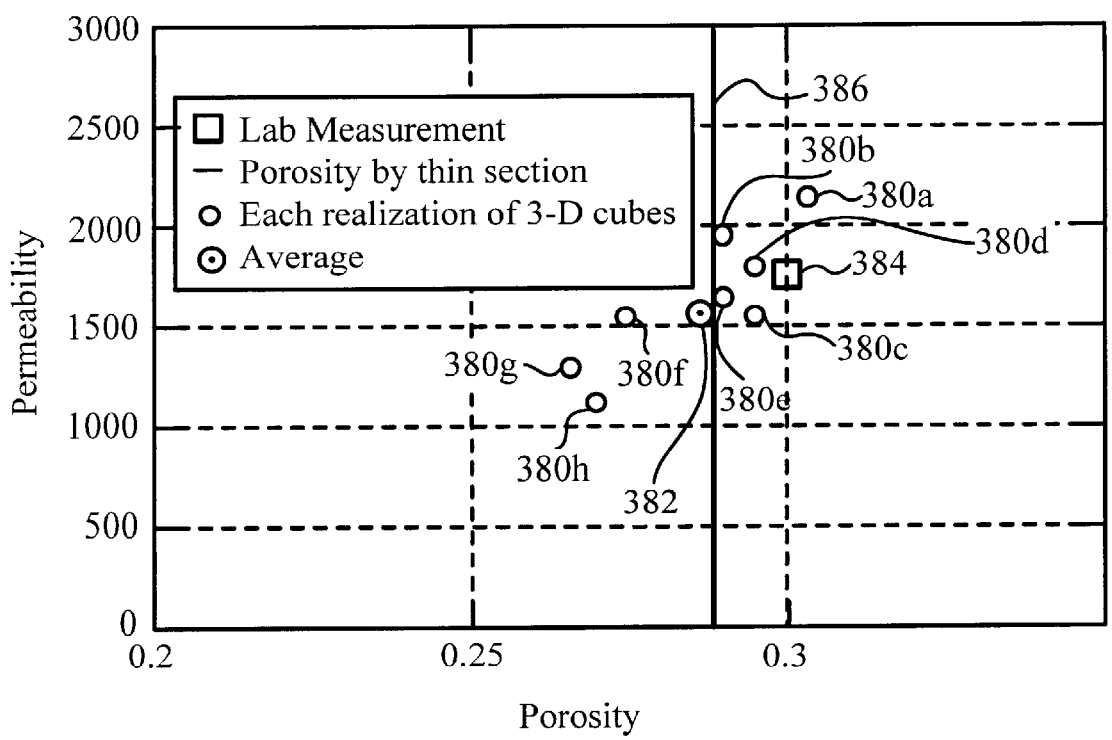
FIG. 5A is a graphic representation of permeability as a function of porosity estimated by Lattice-Boltzmann flow simulation, in accordance with the present invention.

FIG. 5A is a graphic representation of permeability as a function of porosity estimated by Lattice-Boltzmann flow simulation, in accordance with the present invention. A vertical line 386 denotes the porosity calculated in binary index image 218 of a section. Small circles 380a–380h denote average values of permeability for each of eight different 3D realizations. An open circle 382 surrounding a dot denotes the average value of permeability of all eight realizations. An open square 384 denotes the permeability obtained from laboratory measurements. Each specimen is processed by the same method: calculation of porosity and autocorrelation function, simulation of multiple realizations of 3D cubes from each 2D section, fluid flow simulation and calculation of permeability for each realization, and estimation of permeability by averaging over permeabilities of multiple realizations.

Figure 5B:
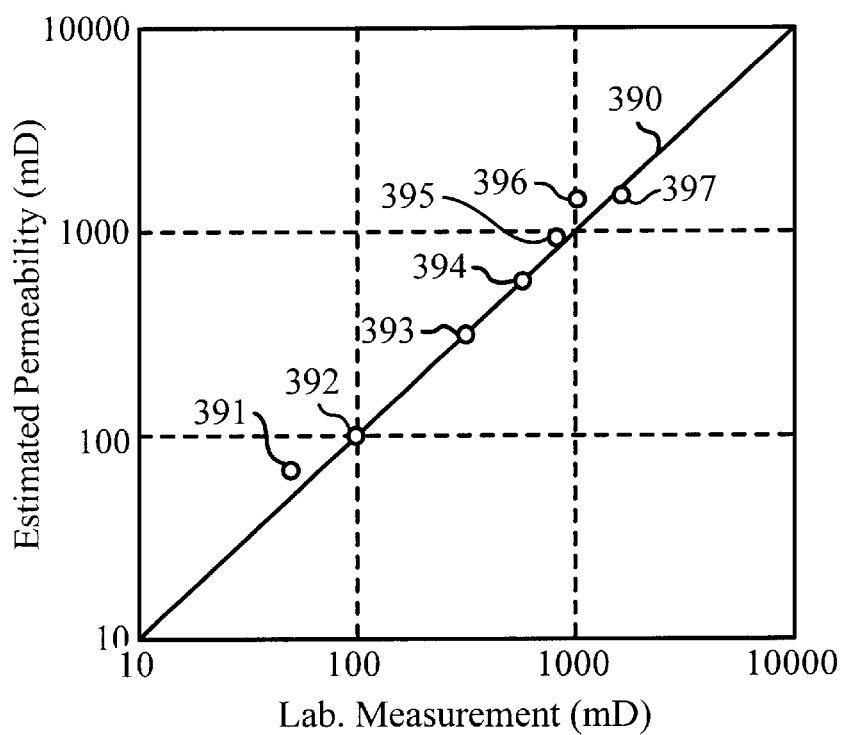
FIG. 5B is a graphic representation comparing measured permeability with estimated permeability in accordance with the present invention.

FIG. 5B is a graphic representation comparing measured permeability with estimated permeability in accordance with the present invention. Units along both horizontal and vertical axes are milliDarcys (mD). A solid diagonal line 390 denotes exact agreement between estimated and measured permeability. The data, denoted by circles 391–397, lie close to diagonal line 390, indicating close agreement between laboratory measurement and estimates according to the present invention, over a range of approximately three orders of magnitude.

Accordingly, it is clear from the above description that the methodology of the present invention provides accurate estimates of physical properties in good agreement with laboratory measurements. It requires only simple and minimal measurements that can be performed easily on specimens of porous media. It operates simply without substantial reliance on empirical parameters. Further, it can provide estimates of multiple physical properties of the same porous media, permitting cross-relations to be examined.

It will be clear to one skilled in the art that the above embodiment may be altered in many ways without departing from the scope of the invention. For example, instead of rock, the porous media can be porous glass, bone, soils, ceramic, sintered granular media, or porous composite such as concrete. Instead of permeability, the desired physical property can be other fluid flow properties, electrical properties, and/or elastic properties, which depend on porosity. Among these physical properties are electrical conductivity, and elastic wave velocity. For the latter two properties, a finite element solver is advantageously applied instead of a Lattice-Boltzmann method. Accordingly, the scope of the invention should be determined by the following claims and their legal equivalents.

What is claimed is:

1. A numerical method of estimating a desired physical property of a three-dimensional porous medium, said desired physical property being selected from the group consisting of fluid flow properties, electrical properties, elastic properties, permeability, electrical conductivity, and elastic wave velocity, said numerical method comprising:

digitizing a color micrograph of a sample of said three-dimensional porous medium;

converting said digitized microphotograph into a two-dimensional n-ary index image;

deriving a statistical variogram function $\gamma(h)$ from said two-dimensional n-ary index image where $$\gamma(h) = \frac{1}{2N(h)} \sum_{i=1}^{N(h)} [z(r_i) - z(r_i + h)]^2,$$

and where N(h) is number of pairs of data locations a vector h apart;

generating a three-dimensional digital representation of said medium using said n-ary index image together with said statistical variogram function; and performing a numerical simulation on said three-dimensional representation, thereby estimating said desired physical property of said three-dimensional porous medium.

2. The method of claim 1, wherein said act of generating further comprising conditioning two substantially parallel two-dimensional boundaries of said three-dimensional representation to said two-dimensional n-ary index image.

3. The method of claim 1, wherein said act of performing includes providing a numierical solver of Navier-Stokes equations for steady flow within a three-dimensional pore space.

4. The method of claim 3, wherein said numerical solver comprises a Lattice-Boltzmann flow simulation.

5. The method of claim 1, wherein said act of performing includes providing a finite element numerical solver.

6. The method of claim 1, wherein multiple physical properties of said porous medium are estimated, allowing cross-relations be examined.

7. The method of claim 1, wherein each linear dimension of said three-dimensional representation is dependent upon a predetermined number of autocorrelation lengths.

8. The method of claim 1, wherein said acts of deriving and generating include generating plural equiprobable three-dimensional representations of said porous medium.

9. The method of claim 8, wherein said numerical simulation is performed on said plural equiprobable three-dimensional representations such that plural estimates of said desired physical property are obtained.

10. The method of claim 1, wherein said three-dimensional representation has a bounded three-dimensional shape, wherein two boundaries comprise substantially parallel faces.

11. The method of claim 10, wherein said bounded three-dimensional shape is selected from the group consisting of cubes, rectangular prisms, and cylinders.

12. The method of claim 1, wherein said n-ary index image is a binary index image, wherein a first binary index represents a solid portion and a second binary index represents a pore space portion of said specimen.

13. The method of claim 1, wherein indices of said n-ary index image represent portions of said sample, said portions comprising a pore space portion, a solid quartz portion, a solid calcite portion, a dolomite portion, a pyrite portion, a siderite portion, a clay portion, a biotite portion, a muscovite portion, and a solid feldspar portion.

14. The method of claim 1, wherein said sample comprises a thin section of said porous medium.

15. The method of claim 1, wherein said three-dimensional porous medium is selected from the group consisting of rock, glass, bone, soils, ceramic, sintered granular material, and porous composite material.

16. The method of claim 15, wherein said porous composite material is concrete.

17. The method of claim 1, wherein said sample comprising a two-dimensional surface of a specimen of said porous medium.

18. A system for estimating a desired physical property of a three-dimensional porous medium, said desired physical property being selected from the group consisting of fluid flow properties, electrical properties, elastic properties, permeability, electrical conductivity, and elastic wave velocity, said system comprising:

digitizing means for digitizing a color micrograph of a sample of said three-dimensional porous medium;

converting means for converting said digitized microphotograph into a two-dimensional n-ary index image;

generating means for deriving a statistical variogram function $\gamma(h)$ from said two-dimensional n-ary index image and for generating a three-dimensional digital representation of said medium using said n-ary index image together with said statistical variogram function $\gamma(h)$, where $$\gamma(h) = \frac{1}{2N(h)} \sum_{i=1}^{N(h)} [z(r_i) - z(r_i + h)]^2,$$

and where N(h) is number of pairs of data locations a vector h apart; and simulating means for performing a numerical simulation on said three-dimensional representation, thereby estimating said desire physical property of said three-dimensional porous medium.

19. The system of claim 18, wherein said generating means further comprising means for conditioning two substantially parallel two-dimensional boundaries of said three-dimensional representation to said two-dimensional n-ary index image.

20. The system of claim 18, wherein said simulating means further comprising a numerical solver of Navier-Stokes equations for steady flow within a three-dimensional pore space.

21. The system of claim 20, wherein said numerical solver comprises a Lattice-Boltzmann flow simulation.

22. The system of claim 18, wherein said simulating means further comprising a finite element numerical solver.

23. The system of claim 18, wherein multiple physical properties of said porous medium are estimated, thereby allowing examinations of cross-relations.

24. The system of claim 18, wherein each linear dimension of said three-dimensional representation is dependent upon a predetermined number of autocorrelation lengths.

25. The system of claim 18, wherein said generating means further comprising means for generating plural equiprobable three-dimensional representations of said porous medium.

26. The system of claim 25, wherein said numerical simulation is performed on said plural equiprobable three-dimensional representations such that plural estimates of said desired physical property are obtained.

27. The system of claim 18, wherein said three-dimensional representation has a bounded three-dimensional shape, wherein two boundaries comprise substantially parallel faces.

28. The system of claim 18, wherein when said nary index image is a binary index image, a first binary index represents a solid portion and a second binary index represents a pore space portion of said specimen.

29. The system of claim 18, wherein indices of said n-ary index image represent portions of said sample said portions comprising a pore space portion a solid quartz portion, a solid calcite portion, a dolomite portion, a pyrite portion, a siderite portion, a clay portion, a biotite portion, a muscovite portion, and a solid feldspar portion.

30. The system of claim 18, wherein said sample comprises a thin section of said porous medium.

31. The system of claim 18, wherein said sample comprising a two-dimensional surface of a specimen of said porous medium.

32. The system of claim 18, wherein said three-dimensional porous medium is selected from the group consisting of rock, glass, bone, soils, ceramic, sintered granular material, and porous composite material.

33. The system of claim 32, wherein said porous composite material is concrete.

* * * * *

UNITED STATES PATENT AND TRADEMARK OFFICE
CERTIFICATE OF CORRECTION

PATENT NO. : 6,516,080 B1
DATED : February 4, 2003
INVENTOR(S) : Amos M. Nur et al.

It is certified that error appears in the above-identified patent and that said Letters Patent is hereby corrected as shown below:

<u>Title page,</u>
Item [75], Inventor, "Amos M. Nur, Stanford, CA (US)" should read
-- [75] Inventor: Amos M. Nur, Stanford, CA (US)
                     William Bosl, Tracy, CA (US) --

Signed and Sealed this

Tenth Day of June, 2003

JAMES E. ROGAN
*Director of the United States Patent and Trademark Office*